June 14, 1966 O. L. ROSEBROOK 3,255,778
SERVO VALVE MECHANISM
Filed Aug. 19, 1963 2 Sheets-Sheet 2
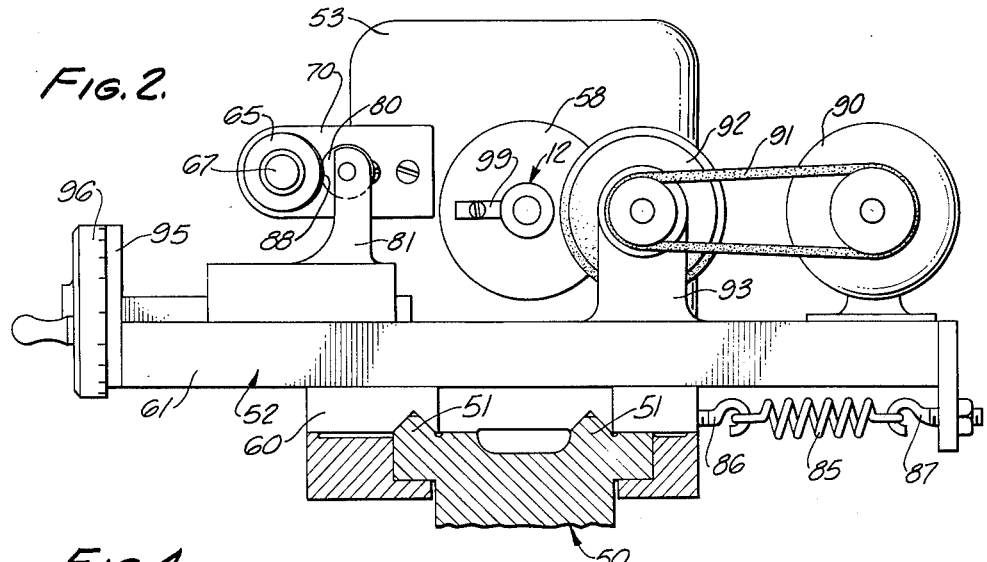
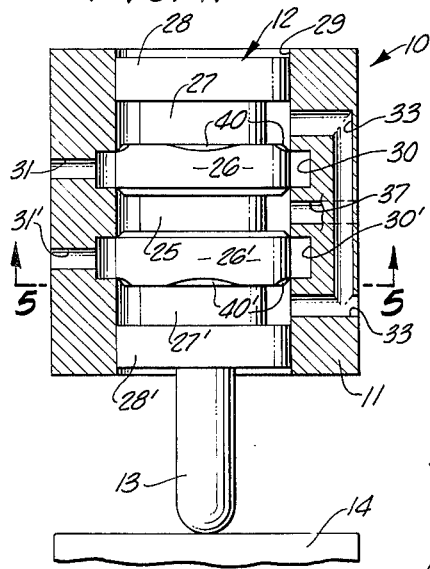
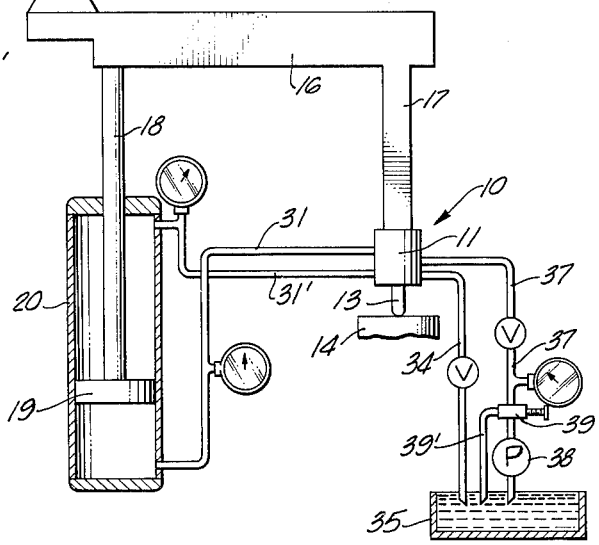
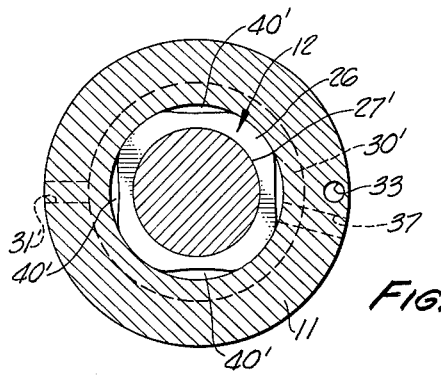
INVENTOR.
OREL L. ROSEBROOK
BY
ATTORNEY United States Patent Office 3,255,778
Patented June 14, 1966

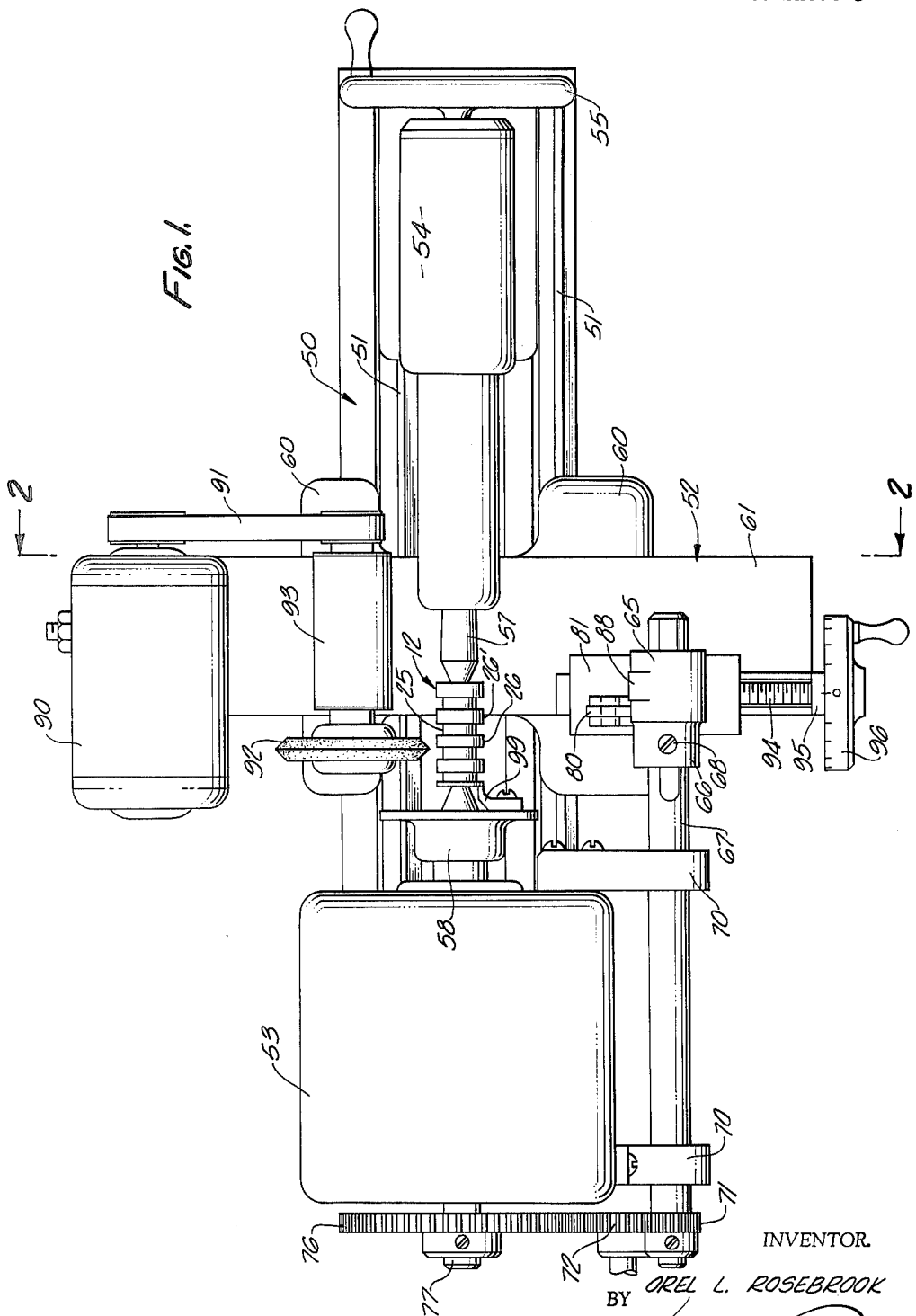

3,255,778
SERVO VALVE MECHANISM
Orel L. Rosebrook, 8243 E. Dorothy Ave.,
South San Gabriel, Calif.
Filed Aug. 19, 1963, Ser. No. 302,825
8 Claims. (Cl. 137—625.69)

This invention relates to servo valve mechanisms and more particularly to a high precision follower valve for use in hydraulic control circuits and capable of faithfully producing both very minute and large movements with high precision and featuring a single movable element operating under fully balanced conditions both when at rest and under load.

The various facets of the present invention provide a servo valve mechanism having unique characteristics useful in a wide variety of hydraulic control circuitry as employed in innumerable operating environments. However, for purposes of illustration and simplicity of disclosure the invention is described in a typical application to move a load in response to a corresponding movement of a master component such as the stylus of a tracer mechanism. It will be understood, however, that the invention is equally suited for a wide range of applications including in particular the control of machine tools, fire control equipment, automated systems of many types and others wherein it is desired to utilize a weak input impulse to control massive loads many many times greater than the input or control signal.

The present invention represents important improvements over certain aspects of the servo valve structures shown in my prior United States Letters Patent 2,984,259, dated May 16, 1961, and 2,958,340, granted November 1, 1960. Each discloses a valve having a single movable spool component provided with a pair of lands separated by a pressurized fluid supply groove and featuring a specially contoured control edge on the remote edges of the two lands. In general these disclosures feature a construction in which the remote rims of the two lands are cut away to provide a pair of elliptically shaped control edges symmetrically disposed relative to the spool axis. This arrangement of the control edges in the exhaust circuit of the slave cylinder possesses important advantages over prior teachings but is subject to certain disadvantages obviated by the present invention.

For example, a spool valve having a generally elliptical control edge as taught in my earlier patents is difficult to manufacture to precision specifications and, when open, is subject to unequal loading concentrically of its axis of movement. In consequence, movement of the valve away from its neutral position unavoidably subjects the spool to lateral displacement away from the side experiencing the greater flow. This jamming action requires a substantially greater input force to move the valve to a different position. This is manifestly undesirable in a high sensitivity, high precision servo valve mechanism. However, according to manufacturing techniques heretofore available for making valve spools of the above-identified patents it was not feasible to provide precision elliptical control edges arranged in out-of-phase relationship to one another nor were the benefits of such out-of-phase relationship appreciated prior to this invention. By the present invention there is provided a fully balanced valve construction wherein the spool component is subject to uniformly distributed fluid pressure conditions at all times and in all positions with the result that the valve is instantly responsive to the slightest low-energy input signal and effective, in combination with the fluid circuits controlled thereby, to convert such a signal into greatly magnified power output forces sufficient to shift a massive load.

The results just referred to are achieved by providing the remote rims of the spool flow control lands with an appropriate number of crescent-like relieved areas equally spaced circumferentially of one another. These critical flow control ports extend circumferentially along at least the remotely spaced rim edges of the control lands and are appropriately described as concavo-convex or crescent shaped, the shorter radius convex edge lying along the cylindrical surface of the lands and the longer radius concave side lying along the outer radial face of the lands. For example, in the embodiment herein illustrated by way of example, each remote rim edge of the two lands is ground away crescent-fashion at four areas each located in a separate quadrant of the rim and with the high points of the crescents spaced 90 degrees from one another. The number of these identical relieved areas can be varied at will but preferably there are two, three, or four relieved areas.

The nature and shape of these relieved areas will be better understood from a description of the method of grinding them which is accomplished by rotating the spool valve about its own axis while moving a bevel edge grinding wheel toward and away from the valve a desired number of times during each revolution of the spool. Thus if four relieved areas are to be formed on the rim edge of the spool land, the grinder is reciprocated into and out of contact with the valve through four complete cycles during a single complete revolution of the spool. This is accomplished under the control of an appropriately shaped cam and cam follower, rotation of the cam being synchronized precisely with the rotary drive for the spool valve. In this manner assurance is provided that each of the relieved areas will be of identical shape, size, and disposition relative to the axis of the spool. Furthermore, it is a relatively simple matter to provide identical reliefs or flow ports on the rim edges of duplicate lands.

It will be understood that this grinding equipment and the method of using the same to grind the flow control ports on the lands of the spool valves constitutes an important aspect of the invention.

It is therefore a primary object of the present invention to provide an improved high-precision servo valve mechanism.

Another object of the invention is the provision of a servo valve mechanism inherently self-balanced in all operating positions and uniformly responsive to the slightest input signal.

Another object of the invention is the provision of a servo valve highly sensitive and responsive to minute input signals and capable of controlling a relatively massive load quickly, reliably and without overshoot or hunting.

Another object of the invention is the provision of a servo valve mechanism having a principal flow control element so contoured and arranged as to provide a relatively small fluid flow initially and to gradually increase the fluid flow while intiating movement of the workload and then to gradually decrease flow as the workload is brought to its desired, precise, new position.

Another object of the invention is the provision of a servo valve having a balanced movable element formed with a plurality of specially contoured flow ports of identical shape and size uniformly distributed about this element.

These and other more specific objects will appear upon reading the following specification and claims and upon considering in connection therewith the attached drawing to which they relate.

Referring now to the drawing in which a preferred embodiment of the invention is illustrated:

FIGURE 1 is a top plan view of apparatus for grinding flow control ports in accordance with the principles of the present invention;

FIGURE 2 is a cross-sectional view through the apparatus taken along line 2—2 on FIGURE 1;

FIGURE 3 is a diagrammatic illustration of the invention servo valve mechanism located in a typical operating environment.

FIGURE 4 is a longitudinal sectional view through the servo valve mechanism according to one preferred embodiment thereof; and FIGURE 5 is a cross-sectional view taken along line 5—5 of FIGURE 4.

Referring initially more particularly to FIGURES 3, 4 and 5 there is shown a typical illustrative embodiment of a servo valve mechanism designated generally 10 embodying the principles of the present invention. As there shown the mechanism comprises a cylindrical housing 11 reciprocally supporting a precision of spool valve 12 having sensing probe or stylus 13 projecting axially from one end. The outer end of this stylus bears against a master pattern 14 or against any other object, the position of which or the surface contour of which it is desired to have sensed or followed at the work producing end of the equipment controlled by valve 10 and here represented diagrammatically by a load 15 in FIGURE 3. As there shown, workload 15 is mounted on a rigid support 16 having a bracket 17 rigidly secured to servo valve housing 11.

Also attached to the work load supporting frame 16 is the piston rod 18 of a piston 19 housed within a slave cylinder 20 suitably rigidly supported. The axis of piston rod 18 will be understood as parallel to the axis of spool valve 12 and the fluid circuit connections between a source of pressurized fluid in the opposite ends of cylinder 20 will be described presently. Together piston 19 and cylinder 20 comprise a linear motor.

Referring now to FIGURE 4 it is pointed out spool valve 12 is provided with a pressurized fluid receiving groove 25 positioned between a pair of identical flow control lands 26, 26' to either side thereof. A pair of annular grooves 27, 27' located on the remote face ends of lands 26, 26' serve to carry away fluid being exhausted from one or the other ends of slave cylinder 20 to a receiving reservoir as will be described more fully below. Bearing lands 28, 28' at the opposite ends of spool valve 12 having a close sliding fit with the central bore 29 of valve casing 11 and, if desired, these may be provided with suitable fluid seals.

Valve housing 11 is formed with a pair of grooves 30, 30' having an axial width of precise dimension accurately coordinated with the width of valve lands 26, 26' as herein shown. However, it will be understood that in certain applications of the principles of this invention the width of grooves 30, 30' may be substantially greater than the width of juxtaposed lands 26, 26'. Grooves 30, 30' are connected respectively through conduits 31, 31' with the opposite ends of slave cylinder 20, whereas grooves 27, 27' are connected through a common connecting passage 33 within housing 11 to conduit 34 leading to a fluid storage reservoir 35. Pressurized fluid is supplied to central groove 25 of the servo valve through conduit 37 and a pump 38 having its inlet in communication with reservoir 35. Conduit 37 is provided with any suitable pressure relief valve 39 provided with a fluid return conduit 39' discharging to reservoir 35 all fluid in excess of that required to maintain a desired pressure in conduit 37 under all operating conditions.

The remote rims of lands 26, 26' are provided with crescent-like relief areas or flow ports 40, 40' of identical size, shape and area, and equally spaced from one another. The major dimension of each is located centrally between its opposite tapering ends. In general the surface proper of these flow ports lie at a suitable angle to the axis of the spool valve, as 45 degrees. The opposite rim edges of lands 26, 26', prior to being formed with ports 40, 40' are annular and lie in parallel planes at right angles to the axis of valve 12. As herein shown these end faces of the lands are spaced from one another by a distance appreciably greater than the width of fluid distributing grooves 30, 30' in order that the width of the latter grooves is just sufficient to prevent flow through ports 40, 40' in one position only of valve 12. On the other hand in this precise neutral position of the valve there may be some flow through these ports but the flow will be identical through each set of ports 40 and 40'. Inasmuch as the inner adjacent edges of lands 26, 26' are continuous and annular, it will be recognized that slight opening of these edges provides a substantially larger flow area between supply groove 25 and the fluid distributing grooves 30, 30' than does slight opening of the relatively short ports 40, 40'. In these circumstances a substantial pressure head is always maintained in grooves 30, 30' since the inlet flow area to the grooves is always greater than the outlet flow area past ports 40 or 40'.

The precise nature of flow ports 40, 40' will be better understood from the following description of the invention method and apparatus for forming these ports in an accurately machined spool 12.

Referring now to FIGURES 1 and 2, there is shown a suitable apparatus for simultaneously grinding one set of identical flow ports 40 or 40' on the lands of spool 12. This apparatus comprises a main frame 50 having a pair of upwardly facing guide rails 51 slidably supporting lengthwise thereof a grinder assembly 52. Supported on the opposite ends of main frame 50 is a head stock 53 and a tail stock 54. Tail stock 54 is provided with clamping control wheel 55 for clamping a spool valve 12 between live center 57 carried by the tail stock and the driven chucking center 58 carried by head stock 53.

It will be understood that grinder assembly 52 includes a main support or bed plate 60 slidable lengthwise of guide rails 51, 51 and a main frame arranged to slide horizontally and transversely of guide rails 51 along the latter of which grinder assembly 52 is slidable. Accordingly grinder frame 61 can slide to and fro crosswise of the axis of head stock 53 for purposes which will be better understood presently.

Means for reciprocating grinder frame 61 to and fro crosswise of the apparatus comprises a double-ended cam 65 having a hub 66 secured to drive shaft 67 by set screw 68. Shaft 67 is mounted on one side and parallel to the axis of head stock 53 by brackets 70. This shaft 67 is driven in synchronism with the head stock drive shaft 77 by a gear 76 secured to shaft 77 and mating with suitably supported idler gear 72 in mesh with gear 71. It is pointed out that driving gear 76 and driven gear 71 are so proportioned relative to one another as to rotate cam 65 a predetermined number of complete revolutions for each complete revolution of valve 12. For example, if it is desired to grind four relief ports 40 on each of the valve lands, then shaft 67 is rotated exactly four times for each revolution of shaft 77.

Cam 65 operates to reciprocate the grinder carriage 52 toward and away from valve spool 12 by means of a cam follower roller 80 supported on a slide 81 adjustably secured to grinder frame 61 in a manner to be described. Cam follower 80 is held in firm, positive contact with the contoured surface of cam 65 at all times by means of a strong spring 85 (FIG. 2) having one end anchored at 86 and the other end anchored to grinder frame 61 by means 87. To be noted at this time is the fact that, as here shown, cam 65 has identically contoured opposite ends, as cylindrical separated eccentrically by a cylindrical mid-portion 88. Thus it will be understood that cam follower 80 is adjusted to bear against either of cams 65 depending on which of the lands 26, 26' is being ground and upon mid-portion 88 when grinding the adjacent rim edges of lands 26, 26'. Thus when grinding the outer edge of land 26 the grinder is positioned against the left hand one of cam surfaces whereas when the edge of land 26' is being ground, follower roller 80 is positioned opposite the right hand half of cam 65. Once the grinder is properly positioned to grind a particular one of the lands the grinder carriage is locked to main frame 50 in any suitable manner.

Suitably supported on the far side of grinder frame 61 is a motor 90 connected by a belt 91 to a shaft supporting a beveled grinding wheel 92. This wheel and its grinding shaft are journalled in a bracket 93 carried by frame 61.

A suitable fine adjusting means is provided for adjusting the relationship of the grinding wheel to cam 65 which, as shown, comprises an adjusting screw 94 having its outer end rotatably journalled in a bracket 95 secured to grinder frame 61. This threaded shaft is provided with a hand wheel 96 for rotating the screw in mating threads provided in a slide 81 supporting cam follower roller 80. By proper adjustment of hand wheel 96 and screw 94 the relative position of the grinding wheel to cam 65 can be adjusted to vary the approach of grinding wheel 92 to valve spool 12 during each reciprocation of the grinder carriage. In other words the adjustment of hand wheel 96 enables the operator to control the depth of cut along the rim edge of the lands as grinding proceeds.

Operation

The mode of making the spool valve will be quite apparent from the foregoing detailed description of the valve and of the grinding mechanism shown in FIGURES 1 and 2. The first step is to prepare the spool valve itself with flow control lands 26, 26' interposed between grooves 25, 27, and 27'. Of importance is the fact that lands 26, 26', together with ports 40, 40' have their flow control edges spaced axially apart precisely by the same distance as the adjacent side walls of distributing grooves 30, 30'. It is also important that lands 26, 26', as initially prepared, overlap the width of grooves 30, 30' by a substantial amount as respects the remote edges of the latter grooves. Otherwise it is not possible to provide the latter with the feathering and self-balancing flow ports 40, 40' in such manner that all fluid flow from grooves 30, 30' is either cut off or equal through the respective sets of ports 40 and 40' in the exact neutral position of the servo valve. It will therefore be clear that under these circumstances the valve spool is exactly self balanced without tendency to move in either axial direction or in any radial direction.

To form and to space the feathering flow ports equidistantly from one another along the remote rim edges of lands 26, 26' a skilled workman places a properly prepared valve spool in the apparatus shown in FIGURES 1 and 2 and locks the spool against rotation relative to the driving head stock shaft 77 in any suitable manner, as by a typical lathe dog 99 (FIG. 1). Grinder carriage 61 is then adjusted until the right hand half of grinder wheel 92 is positioned opposite the outer rim edge of land 26, as is clearly illustrated in FIGURE 1. Hand wheel 96 is adjusted to shift the grinder frame toward the operator with all parts of the grinding apparatus rotating and until the grinding wheel is in like grinding relation to the valve spool. The grinding operation is carried on cautiously as hand wheel 96 is manipulated periodically to advance the grinder wheel closer toward the center of the valve spool and is continued in this manner until the merger of the outermost edge of the relieved areas 40 and land 26 is in the proper position and in accordance with the criteria noted above.

The operator then backs away the grinding wheel from the valve spool by means of hand wheel 96 and unlocks the grinder while shifting it to the right as viewed in FIGURE 1 until the left hand half of grinding wheel 92 is in grinding position with respect to the right edge of valve land 26' and follower 80 is in position to bear against the right hand half of cam 65 whereupon the grinder is rigidly clamped to main frame 50. The grinder is then used in the same manner described above to form the same number of identical flow ports 40' on land 26'. The grinding operation may be stopped from time to time as check measurements are made to determine the progress of grinding since the slightest overgrinding will necessitate rejection of the valve spool. Once the grinding of ports 40, 40' has been completed and these have been checked for accuracy, the finished valve spool is assembled within its casing 11 and placed in its intended operating environment of which FIGURE 3 is generally typical.

The hydraulic fluid pump 38 is then operated to provide a continuous supply of constant pressure fluid available and present in the high pressure fluid groove 25 so long as cut off valve in conduit 37 is open.

If a corrective signal is supplied to sensing stylus or probe 13 through movement of member 14 or a change in the surface contour of this member at the point of contact with stylus 13, the servo valve spool will be shifted away from its neutral position in one axial direction by a certain increment. Assuming that this initial increment of movement shifts the spool valve in an upward direction as viewed in FIGURES 3 and 4, it will be recognized that, immediately, high pressure fluid present in groove 25 enters distributing groove 30 throughout the very small annular slit opened between the adjacent edge of land 26 and the juxtaposed inner edge of groove 30. Since the spool valve has moved upwardly by a slight increment ports 40 are now closed and pressurized fluid entering groove 25 is confined to flow through conduit 31 into the lower end of cylinder 20 where it acts to shift piston 19 upwardly in opposition to load 15. As this occurs the fluid filling the upper end of cylinder 20 is exhausted therefrom through conduit 31' and flows into groove 30' of the servo valve. The spool valve having moved upwardly initially all fluid entering groove 30' flows through ports 40' and thence through groove 27', passage 33 and conduit 34 back to the fluid reservoir 35.

It is important to observe at this point that a slight increment of upward movement of the valve spool opens a slight but continuous annular passage past the inner edge of land 26 into groove 30 thereby allowing a relatively large flow of pressurized fluid into the lower end of cylinder 20. Because of the ample flow thus provided and the high pressure available from pump 38, this fluid is effective over the large area of piston 19 to supply an instantaneous and high power output to move load 15. Any substantial movement of the load is positively prevented by the relatively restrictive exhaust flow permitted from the upper end of cylinder 20 past ports 40'. In other words, since only very short portions of the control edges of these ports are open to groove 30', it will be recognized that only limited outflow of fluid can take place from the upper end of cylinder 20 despite the greater volume of high pressure fluid present on the lower side of piston 19.

Any slight upward movement of the pistion and of load 15 is accompanied by an equal movement of bracket 17 supporting housing 11 of the servo valve mechanism. Upward movement of this housing serves to return the valve spool to its neutral position thereby feathering and cutting off the flow and restoring stable conditions in the system until such time as there is another call for a change in the position of load 15.

Let it be assumed now that the next demand for movement of the load is in a downward rather than an upward direction. When the initial signal for this purpose is sensed, the accompanying movement of the spool valve relative to housing 11 allows the inner edge of land 26' to open into distributing groove 30'. Immediately this occurs, a relatively large quantity of pressurized fluid flows into the upper end of cylinder 20 as a restricted quantity of fluid endeavors to flow from the lower side of the pistion through conduit 31. In other words the parts operate in exactly the same manner described above except that the action and counter-action occur in reverse manner to that first described.

There remains to point out and emphasize that any flow, however small, past ports 40 or 40' occurs in equal amount through all ports of any one set. Since these flows are equal to one another and equally distributed or spaced about the periphery of the valve spool, it follows that this uniform flow is effective to hold the valve spool centered and fluid pressure-balanced coaxially of casing 11. In consequence there is no tendency for the valve spool to shift in any direction under load irrespective of the size of the load as determined by the fluid pressure acting in the servo circuit and determined by the setting pressure of pressure relief valve 39. In this manner there is avoided any possibility of stress or strain on the valve spool or any tendency to vary the resistance to movement of the spool in any lateral direction. For these reasons the energy to move the spool remains uniform and constant for all movements of the servo valve whether very small or large.

While the particular servo valve mechanism together with method and apparatus for making same herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. A chatterless servo valve assembly for controlling the direction and amount of movement of a fluid motor with high precision, said servo valve assembly comprising a cylindrical housing reciprocably supporting a spool valve therein having a pair of lands spaced to either side of a pressurized fluid supply groove, a pair of annular grooves in said housing having a width and so disposed relative to said lands as to provide exactly equal conditions of flow and fluid pressure between said fluid supply groove in said spool and said pair of grooves in the precise neutral position only of said spool and unequal flow but continuing balanced pressure conditions in all other positions to either side of said neutral position, said spool having an exhaust groove on the remote sides of each of said lands, the remotely spaced rim edge of each of said lands being ground off at a plurality of equally spaced elongated areas extending circumferentially along said rim edges, each of said areas being identical with one another and lying at an angle to the spool axis and being widest at its midportion and tapering sharply in opposite directions into merger with said rim edges with the surface of each of said elongated areas lying in a conical surface having its axis parallel to the axis of said spool and its center radially offset by an identical distance from said spool axis and further characterized in that the circumferential length of said areas is several times the transverse width thereof.

2. A hydraulically centered and balanced chatterless servo valve assembly for controlling the movement and position of a reversible fluid motor and adapted for use with high pressure hydraulic fluid, said assembly having a main housing enclosing a unitary movable circular valve member, said valve member having a close fit with the juxtaposed interior surfaces of said housing and having an encircling distributing groove for pressurized fluid separating a pair of identical lands having a fluid-tight movable fit with the interior surfaces of said housing, a fluid outlet groove opening through the interior surfaces of said housing and positioned opposite each one of said lands and adapted to be connected one to either end of said reversible fluid motor, the rim edges of said pressurized fluid groove lying in parallel planes, and the remotely spaced rim edges of said lands being relieved to identical degrees in a surface of revolution lying at an angle to the axis of said valve member and spaced equidistantly from one another circumferentially therealong to provide a plurality of identical exhaust fluid exit ports from said outlet grooves into said housing at the opposite ends of said valve member, and said fluid exit ports having long oppositely tapering ends merging at the rim edges of said lands and being widest at their midportions and having a length circumferentially of said lands several times greater than the width of said ports in the direction of fluid flow therethrough whereby said valve member is dynamically centered and balanced in all operating positions thereof.

3. A valve assembly as defined in claim 2 characterized in that said lands and said outlet grooves are so shaped and positioned that the flow area between said pressurized fluid supply groove and said outlet grooves is always substantially in excess of the total flow area of said exit ports in all normal operating positions of said valve member.

4. A hydraulically centered and balanced chatterless valve assembly for controlling the movement and position of a reversible fluid motor adapted for use with high pressure hydraulic fluid, said assembly having a main housing enclosing a unitary movable circular valve member, said valve member having a close sliding fit with the juxtaposed interior surfaces of said housing and having an encircling distributing groove for pressurized fluid separating a pair of identical lands, a fluid outlet groove opening through the interior surfaces of said housing and encircling and positioned opposite each one of said lands and adapted to be connected one to either end of said reversible fluid motor, the remotely spaced rim edges of said lands being disposed opposite and overlapping the remotely spaced rim edges of said outlet grooves in all normal operating positions of said valve member, each of said remotely spaced rim edges being relieved to identical degrees therealong to provide a plurality of identical exhaust fluid exit ports opening into an associated annular groove encircling the opposite ends of said valve member, said identical fluid ports being crescent shaped with identical long tapering opposite ends extending circumferentially along said remote rim edges and merging precisely with the associated one of said rim edges and each having an arcuate length several times greater than the flow length of said ports in a direction crosswise of said rim edges, whereby the fluid flows through said crescent shaped ports on either of said lands in any and all normal operating positions of said valve member are equal and mutually effective to hold said valve member hydraulically balanced and centered axially of said housing.

5. A valve assembly as defined in claim 4 characterized in that said fluid exit ports have a surface of revolution of greater radius than the radius of said valve member and a longitudinal axis closely spaced from and parallel to the longitudinal axis of said valve thereby forming crescent shaped flow ports having sharply pointed opposite ends terminating at widely spaced points on the rim edges of said lands.

6. A valve assembly as defined in claim 4 characterized in that the interior of said housing comprises a cylindrical surface and in that said valve member is movable to-and-fro axially thereof from a central null position wherein the total fluid flow through the fluid exit ports across one of said remote rim edges exactly equals the total fluid flow across the other of said remote rim edges.

7. An article of manufacture comprising a circular one-piece valve member having an annular groove encircling its midportion and spaced between a pair of identical lands lying in a common surface of revolution, the remotely spaced rim edges of said lands being identically relieved at a plurality of areas extending circumferentially therealong, said relieved areas tapering sharply at their opposite ends to points of merger with the nonrelieved portions of said remote rim edges and having a length circumferentially of said valve member several times greater than the width thereof and said relieved areas lying in identical surfaces of revolution having centers identically offset from the axis of said valve member, and said identical surfaces of revolution being spaced equidistantly from one another circumferentially of each of said remotely spaced rim edges whereby pressurized fluid flowing across said identical surfaces of revolution is effective to maintain said valve member balanced and centered coaxially of an enclosing housing in which said valve is adapted to be mounted in close-fitting sliding relation.

8. A high-precision chatterless hydraulically-centered and balanced servo valve assembly for controlling the movement and position of a reversible fluid motor, said assembly having a housing formed with a cylindrical bore having a precision sliding fit with a spool valve reciprocable therealong, said spool having a first annular groove in communication with an inlet port for high pressure fluid and located between a pair of identical lands, second and third annular fluid grooves along the remote edges of said lands and in communication with the adjacent sides of a pair of annular fluid grooves formed in the side wall of said housing bore and having an axial width corresponding to and disposed radially opposite a respective one of said lands and across which high pressure fluid flows from said first annular groove to said second and third grooves, the remote rim edges of said lands being provided with a plurality of crescent shaped flow ports of precisely identical shape and flow capacity spaced uniformly along said remote rim edges, said crescent shaped ports having long tapering arcuate ends extending along said rim edges with the tapering ends of adjacent ports pointing toward but terminating short of one another, said identical crescent shaped flow ports having identical long tapering opposite ends extending circumferentially along said remote rim edges and merging precisely with the associated one of said rim edges and each having an arcuate length several times greater than flow length in a direction crosswise of said rim edges whereby the fluid flows through said crescent shaped ports on either of said lands in any and all normal operating positions of said spool valve are equal and mutually effective to hold said spool valve hydraulically balanced and centered axially of said housing whereby the equal fluid flows occurring through said identically shaped ports mutually cooperate in the pressurized-fluid centering of said valve spool axially of said housing bore and whereby said valve spool can be axially adjusted with a negligible applied force of substantially uniform value over a wide range of high fluid pressures.

References Cited by the Examiner

UNITED STATES PATENTS

| | | | |
|---|---|---|---|
| 2,855,733 | 10/1958 | Allison | 51—327 |
| 2,958,340 | 11/1960 | Rosebrook | 137—625.69 |
| 2,982,062 | 5/1961 | Jackson et al. | 51—327 |
| 3,009,480 | 11/1961 | Miller | 137—625.69 |

FOREIGN PATENTS 558,363   1/1944   Great Britain.

MARTIN P. SCHWADRON, *Acting Primary Examiner.*